United States Patent [19]

Anderson

[11] Patent Number: 5,703,162
[45] Date of Patent: Dec. 30, 1997

[54] BRANCHED COPOLYMER PRESSURE SENSITIVE HOT MELT ADHESIVE

[75] Inventor: Carolyn M. Anderson, Stillwater, Minn.

[73] Assignee: H. B. Fuller Licensing & Financing, Inc., St. Paul, Minn.

[21] Appl. No.: 520,041

[22] Filed: Aug. 28, 1995

Related U.S. Application Data

[63] Continuation of Ser. No. 238,678, May 5, 1994, abandoned.

[51] Int. Cl.$^6$ .................... C08L 53/05; C08F 297/04
[52] U.S. Cl. .................... 525/89; 525/98; 525/314
[58] Field of Search .................... 525/314, 98, 89

[56] References Cited

U.S. PATENT DOCUMENTS

| | | | |
|---|---|---|---|
| 4,136,699 | 1/1979 | Collins et al. | 128/290 R |
| 4,391,949 | 7/1983 | St. Clair | 525/99 |
| 4,444,953 | 4/1984 | St. Clair | 525/98 |
| 4,699,938 | 10/1987 | Minamijari | 524/271 |
| 4,714,749 | 12/1987 | Hughes | 526/290 |
| 4,717,749 | 1/1988 | Tang | 524/271 |
| 4,780,367 | 10/1988 | Law | 525/314 |
| 4,785,043 | 11/1988 | Kawai | 524/727 |
| 4,881,996 | 11/1989 | Nussbaum et al. | 156/157 |
| 4,933,409 | 6/1990 | Evans et al. | 526/290 |
| 4,983,674 | 1/1991 | Shigemoto | 525/24 |
| 5,028,646 | 7/1991 | Miller | 524/77 |
| 5,120,781 | 6/1992 | Johnson, Jr. | 524/274 |
| 5,149,741 | 9/1992 | Alper | 525/95 |
| 5,194,500 | 3/1993 | Chin | 525/97 |
| 5,210,147 | 5/1993 | Southwick | 525/314 |
| 5,369,175 | 11/1994 | Hoximeier | 525/99 |
| 5,393,841 | 2/1995 | Himes | 525/314 |
| B1 4,391,949 | 8/1987 | St. Clair | 525/99 |

FOREIGN PATENT DOCUMENTS

| | | |
|---|---|---|
| 0 428 017 A2 | 5/1991 | European Pat. Off. . |
| 2736952 | 2/1979 | Germany . |
| 1-138280 | 5/1989 | Japan . |
| 3-160083 | 7/1989 | Japan . |
| 1-261478 | 10/1989 | Japan . |
| 31-162474 | 7/1991 | Japan . |
| 4-4280 | 1/1992 | Japan . |
| 4-77591 | 3/1992 | Japan . |
| 4-85384 | 3/1992 | Japan . |
| 5-70760 | 3/1993 | Japan . |
| 5-247424 | 9/1993 | Japan . |
| WO 89/11512 | 11/1989 | WIPO . |

OTHER PUBLICATIONS

Kraton® G Polymers, New Developments for Adhesive and Sealant Applications, PAM089.PRE Oct. 28, 1993.
Research Product Data Sheet, *Kraton® Polymer Research Product RP–6912*, Shell Chemical Company.
Research Product Data Sheet, *Kraton® Polymer Research Product TKG–101*, Shell Chemical Company.

*Primary Examiner*—Irina S. Zemel
*Attorney, Agent, or Firm*—Nancy N. Quan; Carolyn A. Fischer

[57] ABSTRACT

An improved hot melt, pressure sensitive adhesive. The adhesive has a unique combination of excellent heat stability and higher tack. The adhesive is utilized in disposable articles such as diapers and sanitary napkins. The adhesive employs a saturated A-B-A block copolymer such as S-EB-S or S-EP-S with B or C side chains such as isoprene or ethylene-propylene.

6 Claims, No Drawings

BRANCHED COPOLYMER PRESSURE SENSITIVE HOT MELT ADHESIVE

This is a continuation of application Ser. No. 08/238,678, filed May 5, 1994 now abandoned.

FIELD OF THE INVENTION

This invention relates to hot melt adhesives comprising block copolymers having a substantially saturated A-B-A block backbone in combination with B or C block chains attached to the midblock or end block. This invention particularly relates to improved pressure sensitive adhesive formulations useful in the manufacturing of disposable articles such as a disposable diaper, a sanitary napkin, a bed pad, incontinent pad, surgical drapes, surgical gowns, and medical devices. Adhesives of this invention may be used to construct such articles or used as a positioning adhesive, where an adhesive layer is used to attach a disposable article such as a sanitary napkin to fabric or a medical device to skin.

BACKGROUND OF THE INVENTION

Hot melt adhesives comprising block copolymers are commonly used as construction and positioning adhesives for disposable articles. Schmidt, et al., U.S. Pat. No. 4,526, 577 claims a pressure sensitive adhesive formulation comprising an A-B-A block or an A-B-A-B-A-B multi-block copolymer containing at least 28% styrene where the B block is butadiene or hydrogenated butadiene. Raykovitz et al., U.S. Pat. No. 4,704,110 teaches an absorbent article utilizing an adhesive with a styrene-butadiene-styrene multi-block A-B-A-B-A-B copolymer. Collins, et al., U.S. Pat. No. 4,136,699 teaches an A-B-A block copolymer having a saturated midblock. Malcolm, et al., U.S. Pat. No. 5,057,571 teaches the use of radial block copolymer having a molecular weight of at least 145,000. Nelson, et al., EP 0,525,251 and Alper et al., U.S. Pat. No. 5,149,741 teach the use of a styrene-isoprene-styrene block copolymers having at least 25% styrene. Masaharu et al., EP 0,428,017 A2 teaches the use of a saturated S-EB-S block copolymer blended with an S-EP-S block copolymer. Masaharu's invention is directed toward the use of high diblock S-EP-S block copolymers. However, no patents teach the use of a block copolymer having a saturated A-B-A backbone with B or C block side chains in an adhesive which combines the properties of high tack and excellent thermal stability.

The present invention teaches a novel new block copolymer structure which exhibits surprising advantages over formerly disclosed and available block copolymer structures. To date, if one sought a heat stable adhesive, a SEBS block copolymer would be preferred. However, an adhesive requiring high tack would typically be a SIS or SBS block copolymer composition. A mixture of these block copolymers would not produce an adhesive with both high tack and excellent heat stability. One would expect the adhesive properties of the present A-B-A, block copolymer having B or C chains to be intermediate between a saturated A-B-A block copolymer and a B or C block copolymer structure. Surprisingly, this new structure offers the advantages of both block copolymer structures without compromising the advantages of one structure over the other. Furthermore, it allows for block copolymer combinations that would phase separate if combined by traditional blending techniques.

Although Collins et al., teaches the use of a saturated A-B-A block copolymer, Raykovitz and Masaharu discuss the disadvantages of using this polymer structure. Raykovitz states, "In order to obtain the necessary properties, the compositions disclosed in U.S. Pat. No. 4,136,699 require the use of specific block copolymers wherein the mid-block is hydrogenated and wherein relatively large amounts of oil are needed in proportion to the amount of block copolymer. These hydrogenated copolymers are relatively expensive and are difficult to tackify." Masaharu discusses shortcomings of S-EB-S technology when he states, "when they are used for long periods of time in body temperature atmospheres they have the drawback that the hot melt gradually softens and penetrates into the underlayer to which [the napkin, etc.] is adhering, the apparent adhesive force greatly increases and at the same time the cohesive force is reduced so that the adhesive layers suffers cohesion breakdown when the napkin, etc. is removed and some of the recognized adhesive remains on the underlayer." Therefore, there is a need for a saturated block copolymer that is easily tackified and does not require the use of relatively large amounts of oil.

SUMMARY OF THE INVENTION

The present invention discloses an improved hot melt, pressure sensitive adhesive composition having high tack and excellent thermal stability. The adhesive comprises about 3 to 45 percent by total weight of a substantially saturated A-B-A block copolymer having B or C chains; 0 to about 35 percent by total weight of a compatible block copolymer; about 10 to 50 percent by total weight of a plasticizer; and 0 to about 65 percent by weight of a solid tackifying agent.

DETAILED DESCRIPTION OF THE INVENTION

The present invention is a hot melt pressure sensitive adhesive comprising an A-B-A block copolymer having B or C chains, wherein the A-B-A block backbone is saturated and the side chains are of the same composition or of a different composition than the mid-block of the backbone. Preferably, the backbone consists of an A block of polystyrene, a B block of ethylene-propylene or ethylene-butylene or mixtures thereof, and chains of ethylene-propylene, ethylene-butylene, isoprene, butadiene, or mixtures thereof. Such polymers are available from Shell Chemical under the experimental numbers of TKG-101 and RP6912. TKG-101 has a S-EB-S backbone with isoprene side chains while RP-6912 has a S-EP-S backbone with an ethylene-propylene side terminal chains. A saturated backbone in combination with side chains gives this polymer unique advantages over existing technologies. It is believed since the side or terminal chains are not involved in the formation of styrene domains, pressure sensitive adhesives comprising this polymer base exhibit improved tack without comprising heat stability.

This uniquely structured polymer is the major component of the adhesive of this invention. Preferably this polymer is present in the amount of 15 to 45 percent by weight if used independently or in the amount of 3 to 30 percent if used in combination with other compatible block copolymers. More preferably this polymer is present in an amount of 18 to 30 percent by weight if used independently or, 5 to 20 percent by weight if used in combination.

Tackifiers

Suitable tackifiers, present up to 60 weight percent, may be selected from the group consisting of compatible C5 resins, hydrogenated C5 resins, styrenated C5 resins, styrenated terpene resins, hydrogenated C9 resins, rosin derivatives and mixtures thereof.

Commercially available tackifying resins useful for the present invention include Eastotac H series resins available from Eastman Chemical, Unttac series available from Union Camp, Sylvatac 1100 series available from Arizona Chemical Company, Wingtack resins from Goodyear, and Zonatac Resins from Arizona Chemical Company. The amount of tackifying resin is about 0 to 65 percent by weight of the adhesive and preferably about 45 to 65 percent by total weight of the adhesive.

Plasticizers

Suitable plasticizers, present from about 10 to 50 weight percent, include low aromatic content hydrocarbon oils that are paraffinic or napthenic in character, low molecular weight polybutene, and compatible liquid resins of the same composition as the tackifiers. The use of olefin oligomers, low molecular weight polymers, vegetable oils and their derivatives as well as similar plasticizing liquids is also envisioned.

Plasticizing oils preferred for the present invention include naphthenic and paraffinic oils commercially available from a number of suppliers including Shell Chemical Company, Witco, etc. The amount of plasticizing oil is about 0 to 50 percent by weight and preferably about 10 to 35 percent by weight.

As is known in the art, various other components can be added to modify the tack, color, odor, etc., of a hot melt adhesive. Antioxidants and other stabilizing ingredients can also be added to protect the adhesive form various heat and lights induced degradation.

The following table sets forth useful, preferred, and most preferred formulas of the present invention.

TABLE 1

| Ingredient | Useful | Preferred | Most Preferred |
| --- | --- | --- | --- |
| Block Copolymer* | 3–45% | 15–35% | 18–30% |
| Tackifier | 0–65% | | 45–65% |
| Plasticizing Oil | 10–50% | | 10–35% |

TEST METHODS

Creep

This procedure covers the method for applying and testing adhesives used for multi-strand elastic attachment.

Material and Equipment

1. High-speed coater laminator similar to Meltex CT-225.
2. Spiral spray Hot Melt applicator such as a Nordson 3400 unit.
3. Polyethylene backsheet film treated to approximately 38 dynes
4. Thermobond nonwoven topsheet available from Scott.
5. 4 strands natural rubber or 3 strands Lycro multi-strand elastic
6. 100° F. oven
7. Cardboard or wood board 1 in. wide and at least 12 in. long, with lines drawn across at 300 mm and 285 mm Application Procedure Adjust hot melt applicator to proper settings.

Preferred settings are as follows:

| Temperature | 300 F. |
| --- | --- |
| Nip Pressure | 30 psi |
| Application Rate | 15 mg/sq. in |
| Unwind Tension | .5 lbs |
| Rewind Tension | 1.5 lbs |
| Web Speed | 400–500 ft/min |
| Elongation | 250% - natural rubber |
| | 300% - Lycra |

Spray the adhesive through the elastic strands and to the treated side of the poly. The height of the nozzle should be adjusted to allow the air volume to be as high as possible to achieve the most wrapping of the glue around the elastic without overspray.

Test Procedure

1. Staple one end of the multi-strand elastic attachment lamination to the edge of the cardboard with the polyethylene side up.
2. Extend the sample to 100% of full extension being careful not to overextend the poly.
3. Mark the sample where it reaches the 300 mm marking on the cardboard.
4. Relax the sample until the sample marking reaches the 285 mm marking on the cardboard, and staple the other end of the attachment. The sample is now secured at 95% of full extension.
5. After at least five samples have been attached in this same manner, cut through the individual strands of elastic at each end of the attachments, allowing the strands to be able to move within the lamination. Be careful not to cut the entire polyethylene sheet.
6. Condition the board with the anchored test specimens at 100 Deg. F. for one hour.
7. Remove the board and specimens from the oven and mark the polyethylene where the elastic is still bonded, represented by the gathered portion of the attachment.
8. Return the board and specimens to the oven for three additional hours (4 hours total).
9. Remove the board and specimens, and once again mark the polyethylene where the elastic remains bonded.
10. Measure the length of the initial bond 285 (mm), the bond length at one hour, and the bond length at four hours.
11. Report 95% confidence interval of percent creep.

Calculations $$\text{Percent creep} = \frac{\text{initial length} - \text{length at } X \text{ hours} \times 100}{\text{initial length}}$$

FINELINE & SPRAY

Sample Preparation

Prepare fineline and spray bonds using the same setting as the creep test at application rates of 1.4 mg/linear inch for fineline and 4 mg/sq. inch for spray spiral. During the run drop 8–10 2"×8" strips of release paper cross directional across the web. These pieces of paper serve as starting points for T-peel evaluations. Cut 10 samples one bead or one spray spiral in width by 3" in length. Run T-peels on a slip-peel tester, Inston or other suitable force measuring device at 12"/min. Average 10 samples for the peel value.

T-peel Testing

This test method describes how to measure the removal force of an adhesive surface bonded to fabric.

Prepare hot melt coated adhesive films on Mylar or polyethylene film using an Acumeter of Meltex coater at an appropriate application temperature. The coat weight is checked with a target coat weight of 50 g/m2+/–3 g/m2.

Strips of test fabric are cut into 1 ½"×5" strips. The adhesive coated Mylar is cut into 1 inch×4 inch strips in machine direction. Remove the release paper and place the adhesive surface of one 1" wide strip onto the fabric. Place the composite on the mechanical roll-down device, and allow the roller two passes over the sample, one forward and one back. A timer is activated and the sample is placed into the jaws of the slip-peel tester available from Instrumentors Inc. The 1" wide strip is placed into the jaw that moves and the fabric is placed into the jaw which is stationary. For initial T-peel testing, no more than one minute after the sample has been removed from the roll-down device, the sample is peeled at 12 ipm, averaging over 10 seconds. The procedure is repeated five times, recording the average T-peel value and noting any legging or adhesive transfer. The T-peel values are reported in grams per lineal inch.

In the disposable article industry, it is preferred to have an initial t-peel to cotton in the range of about 100–500, most preferred about 200–500 grams per lineal inch without any indication of adhesive transfer.

Viscosity Stability @325° F.

A 10.5 g sample of adhesive is melted in a Brookfield thermosel @325° F. Using spindle 27, the viscosity is recorded continuously on a chart recorder for 96 hours.

EXAMPLES

Examples 1 and 2 are targeted for construction applications, whereas example 4 is intended to be used as a positioning adhesive.

TABLE 1

| Ingredient | Example 1 | Example 2 | Comparative A U.S. Pat. No. 5,149,741) | Example 3 |
|---|---|---|---|---|
| Kraton TKG-101 | 24.8 | | | |
| Kraton RP-6912 | | 24.8 | | |
| Sol T-193B | | | 24.8 | |
| Kraton G-1657 | | | | 16.4 |
| Vector 4111 | | | | 8.4 |
| Eastotac H-100 | 59.7 | 59.7 | | 59.7 |
| Bevelite 62-107 | | | 59.7 | |
| Kaydol Oil | 15.0 | 15.0 | 15.0 | 15.0 |
| Irganox 1010 | 0.5 | 0.5 | 0.5 | 0.5 |

| Test Result 1 | | | | |
|---|---|---|---|---|
| % Creep Lycra | | | | |
| 1 Hour | 28% | 25% | 47% | 73% |
| 4 Hour | 50% | 48% | 75% | 89% |
| Fineline | 205 +/– 69 | 344 +/– 78 | | 195 +/– 23 |
| Spray | 118 +/– 9 | 56 +/– 5 | | 187 +/– 19 |
| Viscosity Stability @ 325° F. | | | | |
| Initial | 3700 | 7625 | 2550 | 14000 |
| 4 Hours | 3675 | 8625 | 2450 | 14000 |
| 12 Hours | 3700 | 8688 | 2300 | 14000 |
| 24 Hours | 3700 | 8750 | 1900 | 13750 |
| 48 Hours | 3710 | 8938 | 1400 | 12750 |
| 72 Hours | 3750 | 9205 | 1050 | 12500 |
| 96 Hours | 3790 | 9625 | — | 12250 |
| % Change | +1.4% | +7.2% | –58.8% | –12.5% |

Relative to Comparative A, Examples 1 and 2 exhibit comparable fineline construction bonds and creep resistance with a dramatic improvement in thermal stability. Example 3 is intended to approximate the composition of Example 1 by blending polymers. Although Example 3 exhibits good thermal stability, overall it does not exhibit comparable properties. Example 3 exhibits an initial viscosity nearly 4 times that of Example 1. Example 3 would not spray unless the air pressure was increased to 40 psi. Since the creep performance was also poor, construction bonds were not even tested for this sample.

| Blended Examples | | |
|---|---|---|
| Ingredient | Comparative B U.S. Pat. No. 4,136,699 | Example 4 |
| Kraton G-1650 | 15.3 | 9.2 |
| TKG-101 | | 6.1 |
| Wingtack 95 | 53.5 | 53.5 |
| 1200 Second Oil | 28.0 | 28.0 |
| Irganox 1010 | .1 | .1 |
| Irganox 1076 | .1 | .1 |
| PMS-04110-PHM (pigment) | 3.0 | 3.0 |
| Initial T-peel to Cotton | 451 +/– 44 | 556 +/– 51 |
| Delayed T-peel to Cotton | 277 +/– 17 | 282 +/– 36 |
| Initial T-peel to Nylon | 526 +/– 47 | 803 +/– 86 |
| Stressed T-peel to Nylon | 333 +/– 33 | 571 +/– 84 |
| Viscosity @ 300° F. | 17,000 cps | 7,420 cps |
| @ 325° F. | 7,375 | 2,150 |
| @ 350° F. | 4,840 | 925 |

Example 4 demonstrates the utility of blending these polymers with existing saturated block copolymer. By replacing a portion of Kraton G-1650 with TKG-101, the adhesion to cotton increased by 23%. Furthermore, the viscosity was reduced by 50%.

The present invention is not limited to the examples and embodiments set forth above. As will be understood by those of ordinary skill in the art, alternate embodiments, variations and modifications of the present invention are envisioned.

What is claimed is:

1. A hot melt, pressure sensitive adhesive composition comprising:
   (a) about 5 to about 30 percent by weight of a first block copolymer comprising a substantially saturated A-B-A block copolymer having B or C side chains wherein A is polystyrene, B is selected from the group consisting of ethylene-propylene, ethylene-butylene and mixtures thereof, and C is selected from the group consisting of isoprene, butadiene, and mixtures thereof;
   (b) about 3 to about 10 percent by weight of a second block copolymer selected from the group consisting of styrene-ethylene-butylene-styrene block copolymer, styrene-ethylene-propylene-styrene block copolymer and mixtures thereof;
   (c) about 10 to 50 percent by weight of a plasticizer; and
   (d) 0 to 65 percent by weight of a solid tackifying agent.

2. The adhesive composition of claim 1 having heat stability wherein the viscosity of said composition changes less than 10% over a 96 hour period at 325° F.

3. A disposable article selected from the group consisting of disposable diapers, sanitary napkins, bed pads, incontinent pads, surgical drapes, wherein said article comprises an adhesive composition comprising:

(a) about 5 to about 30 percent by weight of a first block copolymer comprising a substantially saturated A-B-A block copolymer having B or C side chains wherein A is polystyrene, B is selected from the group consisting of ethylene-propylene, ethylene-butylene and mixtures thereof, and C is selected from the group consisting of isoprene, butadiene, and mixtures thereof;

(b) about 3 to about 10 percent by weight of a second block copolymer selected from the group consisting of styrene-ethylene-butylene-styrene block copolymer, styrene-ethylene-propylene-styrene block copolymer and mixtures thereof;

(c) about 10 to 50 percent by weight of a plasticizer; and (d) 0 to about 85 percent by weight of a solid tackifying agent.

4. The hot melt adhesive of claim 1 wherein the adhesive is useful for attaching a sanitary napkin to fabric.

5. The hot melt adhesive of claim 1 wherein the adhesive is useful for attaching a medical device to skin.

6. The hot melt adhesive of claim 4 wherein the initial T-peel to cotton of a 50 $g/m^2$ adhesive coating is greater than about 500 g/linear inch.

* * * * *